(12) United States Patent
Gjerde et al.

(10) Patent No.: US 7,362,596 B2
(45) Date of Patent: Apr. 22, 2008

(54) TRANSFORMER BALANCE CIRCUIT

(75) Inventors: Knut-Ivar Gjerde, Drammen (NO); Erik Myhre, Asker (NO)

(73) Assignee: Eltek Valere AS, Drammen (NO)

( * ) Notice: Subject to any disclaimer, the term of this patent is extended or adjusted under 35 U.S.C. 154(b) by 0 days.

(21) Appl. No.: 11/453,894

(22) Filed: Jun. 16, 2006

(65) Prior Publication Data

US 2007/0001660 A1    Jan. 4, 2007

Related U.S. Application Data

(60) Provisional application No. 60/691,246, filed on Jun. 17, 2005.

(51) Int. Cl.
*H02M 7/08* (2006.01)
*H02M 3/335* (2006.01)

(52) U.S. Cl. .......................... 363/69; 363/17; 363/125

(58) Field of Classification Search ............ 363/15–17, 363/69, 84, 125, 126
See application file for complete search history.

(56) References Cited

U.S. PATENT DOCUMENTS 6,469,486 B1 * 10/2002 Jitaru ......................... 323/356
6,492,880 B1 * 12/2002 Chiappe et al. ........... 333/22 R

FOREIGN PATENT DOCUMENTS

WO    WO- 03/092328 A2    11/2003

* cited by examiner

*Primary Examiner*—Gary L. Laxton
(74) *Attorney, Agent, or Firm*—Birch, Stewart, Kolasch & Birch, LLP

(57) ABSTRACT

A balancing circuit for systems having at least first and second transformers. The transformers' primary sides are connected to one another. The transformers' secondary sides also are connected to one another. The balancing circuit includes a branch connecting one terminal on the secondary side of the first transformer and the corresponding terminal on the secondary side of the second transformer. The branch has a significant impedance such that the voltage in the secondary sides of the transformers is forced to be substantially equal. A method is also provided for performing balanced operation of a system includes at least a first and a second transformer.

6 Claims, 1 Drawing Sheet

TRANSFORMER BALANCE CIRCUIT

The present invention relates to a balancing device for systems comprising transformers.

An example of such a circuit is a series resonance DC/DC converter illustrated in FIG. 1, with an inductor L2 integrated into the transformer. This converter is known as LLC resonance converter. Publication WO 03/092328 illustrates a converter of this type and is included hereby by reference in its entirety.

In some cases two transformers can be an optimal solution for a practical design. With two transformers the designer can reduce current on the output terminals, output diode and PCB. It is also the optimal solution if the height of the design is limited. The two transformers can be connected in series on the primary side and parallel on the output or secondary side.

An example of such a system is illustrated in FIG. 2. Such a system comprises a first transformer TX1 with a primary side and a secondary side and a second transformer TX2 with a primary side and a secondary side. The output or secondary terminals of the first transformer will hereafter be referred to as first and second terminal, while the output or secondary terminals of the second transformer will hereafter be referred to as third and fourth terminals. The first and the third terminals are corresponding terminals. These can e.g. be the upper terminals in each transformer output. In this solution the output voltage Vc6 is reflected through transformers TX1 and TX2 to the primary sides. The voltage on the primary side of the two transformers TX1 and TX2 is substantially equal since the primary voltage is determined by the reflected secondary voltage, and the voltage on the secondary side of both transformers is equal to the output voltage (as long as both output diodes are conducting). The sum of the primary side voltage is approximately Vc1 when neglecting the voltage drop over the resonance inductor.

One well know problem with series resonance converters is the no load condition. Normally it is solved with use of sufficient magnetizing inductance in the transformers.

In a multiple transformer solution with the primary windings series connected, a new problem arises. At no load or at very little load the mid-point where the primary windings are connected together, can start oscillating. The primary voltage is reflected to the secondary side and the output voltage will be equal to the peak voltage of the oscillating primary voltage reflected to the secondary. The oscillation can be explained by the fact that the impedance measured at the midpoint to any other part of the circuit is the result of an un-damped LC-network. The un-damped LC-network consists of winding capacitances and winding inductances as well as other stray capacitances and stray inductances connected to the transformer. An example of another stray capacitance connected to the transformer is the output capacitance of any power semiconductor such as a rectifying diode or a power switching device such as a MOSFET. The LC-network is damped and stable in normal operation with a normal load connected to power supply's output terminal. When the load is removed the damping of the LC-network disappears and an oscillation occurs.

Another effect that can cause the output voltage to rise to an un-wanted level is that even a small difference between the magnetizing inductances of the two transformers TX1 and TX2 will cause a higher voltage over one transformer compared to the other. The transformer with the smallest magnetizing inductance will be the first to stop delivering power to the output, when the load is decreasing because the output diodes (D3, D4, D5, D6) act like an OR-ing connection, in such a way that only the diode connected to highest voltage will conduct and deliver current to the load. When one of the transformers (e.g. TX1) stops delivering power to the output capacitor, the output diode (D3, D4) on this transformer stops conducting. The voltage on the output winding on this transformer (that is between the first and the second terminal) is lower than the output voltage. The result of this is that the reflected primary voltage on this first transformer is lower than the primary voltage the second transformer. Since the sum of the two primary voltages has to be constant the transformer that delivers power to the output (in this case TX2) will have increased primary voltage and the output voltage will increase.

The invention has as an object to solve the problems related to unbalance in transformer circuits where two or more transformers are connected together. In the present description, the invention will be illustrated for the case where two transformers are connected with their primary circuits in series and the secondary circuits in parallel, but it is also possible to use it with other configurations.

The balancing circuit according to the invention comprises a branch for connection between the secondary sides of at least two transformers, where the first transformer comprises a first and a second terminal on its secondary side and the second transformer comprises a third and a fourth terminal on its secondary side, and where the first and the third terminal are corresponding terminals. The branch in the circuit according to the invention is connected between corresponding terminals on the secondary side of the transformers (first and third terminals or second and fourth terminals) such that the voltage drop between said corresponding terminals is forced to be substantially equal. The physical mechanism for this can be described by a current flowing through the impedance in the circuit connected between the corresponding terminals. The current will discharge the output capacitance of the transformer with the higher voltage and charge the output capacitance in the transformer with the lower voltage. The current will flow until the voltage difference between the two (or more) transformers is zero. The balancing circuit can also be regarded as a loss-less dummy load. It is loss-less because when balance is achieved, there is substantially no current flowing through the impedance formed by the balancing network, and therefore no corresponding losses.

In one embodiment of the invention the primary sides of both transformers are connected in series while the secondary sides are connected in parallel.

In one embodiment of the invention the balancing circuit comprises two branches, one for connection to each pair of corresponding terminals.

In an embodiment of the invention, each branch comprises a resistance and a series connected capacitor.

The balance circuit can however comprise other components than resistor and capacitor, and it possible to only use one branch or several branches in the balance circuit. The balance circuit can also be a single capacitor, or a single resistor, or a capacitor in parallel with resistor. Any components forming an impedance between any of the two transformer's outputs with equal voltage will have a balancing effect.

The invention will now be described by means of an example related to resonant converters but he skilled man will understand that this application of the invention is by no means limiting, as a balancing circuit can be used wherever two transformers are connected in series or parallel and in other series or parallel resonant circuits where there are two or more transformers in parallel. This circuit can be used with other dc/dc topologies where unbalance of two or more transformers is a problem.

The invention is illustrated in the following figures where:

Figure 1:
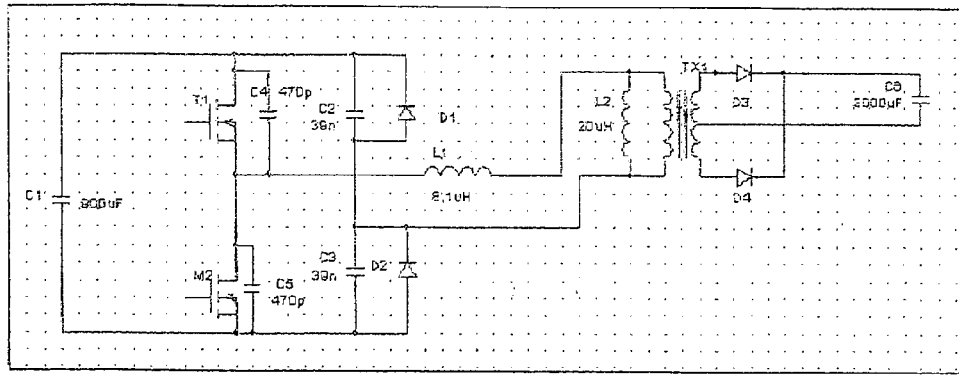
FIG. 1 shows a basis series resonance circuit as described in WO 03/092328.
Figure 2:
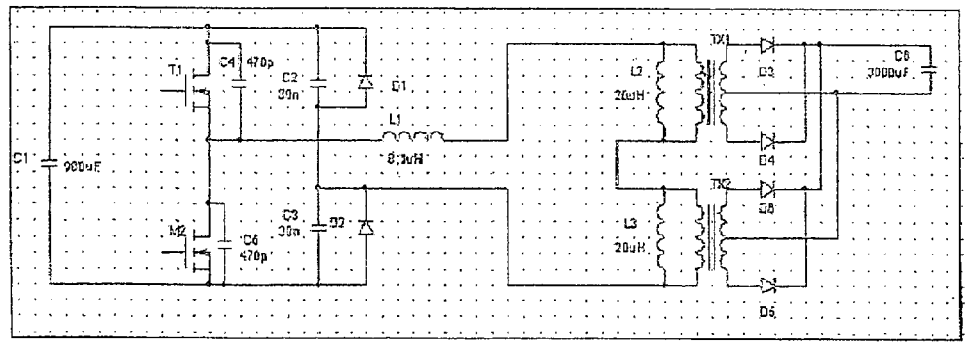
FIG. 2 shows a basic series resonance circuit with two transformers.

FIGS. 1 and 2 have been described above.

Figure 3:
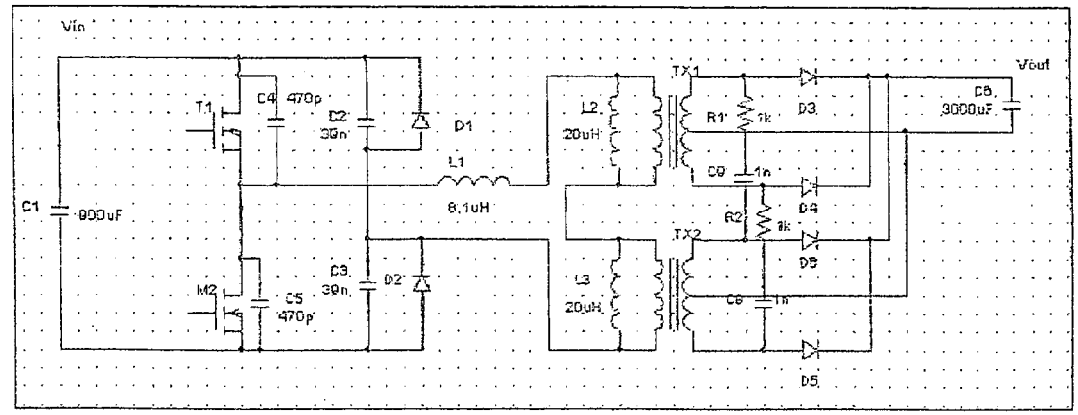
FIG. 3 shows an example of a balance circuit according to the invention.

FIG. 3 shows a balancing circuit for systems comprising at least a first and a second transformers TX1 and TX2, where the transformers' primary sides are connected to one another, and the transformers' secondary sides also are connected to one another. The balancing circuit comprises a branch B1 for connection between one terminal on the secondary side of the first transformer TX1 and the corresponding terminal on the secondary side of the second transformer TX2, the branch B1 having a significant impedance such that the voltage in the secondary sides of said transformers is forced to be substantially equal.

In this example, the balancing circuit comprises two branches B1 and B2, where each branch comprises a capacitor C9 and C8 respectively and a resistor in series with the capacitor (R1, R2 respectively). In a resonant converter circuit of this type typical values for the resistors and capacitors are 10 ohm and 100 nF respectively. Each branch is connected between corresponding terminals that is, the two output terminals of the transformers that normally have equal voltage. The output terminals of the transformers are connected to output diodes D3, D4, D5, D6. If one output diode D3, D4, D5, D6 stops conducting, due to an unbalance in voltage at the output terminals, the balancing circuit will create a path for a balancing current and force the voltage on the secondary side of both transformers to be substantially equal by damping oscillations or charging discharging the transformer's output capacitances as previously described. This will result in equal voltages on the primary sides, and stabile output voltage at low load.

The balance circuit can be made of other components than resistor and capacitor, and it is also possible to only use one balance circuit.

This circuit can be used with other dc/dc topologies where unbalance of two or more transformers is a problem.

The circuit can also reduce EMI problems.

The invention claimed is:

1. Balancing circuit for a transformer system, said system which comprises at least a first and a second transformer, where the transformers' primary sides are connected to one another, and the transformers' secondary sides also are connected to one another, said balancing circuit comprising:
    a branch for connection between one terminal on the secondary side of the first transformer and the corresponding terminal on the secondary side of the second transformer, the branch having a significant impedance such that the voltage in the secondary sides of said first and second transformer is forced to be substantially equal.

2. Balancing circuit according to claim 1, wherein the primary sides of both transformers are connected to one another in series and the secondary sides are connected to one another in parallel.

3. Balancing circuit according to claim 1, wherein the balancing circuit comprises two branches, one for connection to each pair of corresponding terminals in the secondary side of the transformers.

4. Balancing circuit according to claim 1, wherein the balancing circuit each branch comprises a resistance and a series connected capacitor.

5. Method for performing balanced operation of a system, said system comprising at least a first and a second transformer, where the transformers' primary sides are connected to one another, and the transformers' secondary sides also are connected to one another, said method comprising:
    connecting a branch between one terminal on the secondary side of the first transformer and the corresponding terminal on the secondary side of the second transformer to force the voltage in the secondary sides of said transformers to be substantially equal.

6. Balancing circuit according to claim 2, wherein two branches, are connected to the transformers' secondary sides, one connected to each pair of corresponding terminals in the secondary side of the transformers.

* * * * *